(12) United States Patent
Merbreier et al.

(10) Patent No.: US 8,896,999 B2
(45) Date of Patent: Nov. 25, 2014

(54) MOBILE DATA MEMORY

(71) Applicant: Sick AG, Waldkirch (DE)

(72) Inventors: Bernd Merbreier, Freiburg (DE);
Bernhard Kury, Biederbach (DE)

(73) Assignee: Sick AG, Waldkirch (DE)

( * ) Notice: Subject to any disclaimer, the term of this patent is extended or adjusted under 35 U.S.C. 154(b) by 192 days.

(21) Appl. No.: 13/749,813

(22) Filed: Jan. 25, 2013

(65) Prior Publication Data

US 2013/0194743 A1    Aug. 1, 2013

(30) Foreign Application Priority Data

Jan. 31, 2012    (EP) .................................... 12000602

(51) Int. Cl.
*G06F 1/16*    (2006.01)
*G06F 1/18*    (2006.01)
*G05B 19/042*    (2006.01)

(52) U.S. Cl.
CPC ............ *G06F 1/182* (2013.01); *G05B 19/0423* (2013.01)
USPC ................. 361/679.31; 327/158; 365/185.02; 455/450

(58) Field of Classification Search
USPC ............. 327/159, 158, 156; 365/185.21, 232, 365/185.03, 185.18, 201, 185.17, 185.23, 365/185.02, 163, 189.15; 361/679.32, 361/679.39, 679.26, 679.12, 679.01, 361/679.08, 679.31, 679.09, 679.55, 361/679.22, 679.02, 679.05, 679.06, 361/679.44, 679.21, 679.29; 455/556.1, 455/426.1, 418, 41.1, 2.01, 344, 450, 410, 455/67.11, 424, 414.1, 41.2, 466, 561, 136, 455/562.1; 345/161, 503, 1.2, 589, 156, 345/173, 168

See application file for complete search history.

(56) References Cited

U.S. PATENT DOCUMENTS

| | | | |
|---|---|---|---|
| 2005/0070157 A1 | 3/2005 | Neo et al. | |
| 2012/0182393 A1* | 7/2012 | Yagi et al. | ........................ 348/46 |
| 2014/0049469 A1* | 2/2014 | Bragin | ........................... 345/161 |
| 2014/0266355 A1* | 9/2014 | Park et al. | ..................... 327/159 |

FOREIGN PATENT DOCUMENTS

DE    10344263 A1    5/2005

OTHER PUBLICATIONS

Translation of European Search Report dated Jun. 1, 2012 relating to European Patent Application No. 12 000 602.8.

* cited by examiner

*Primary Examiner* — Hung Duong

(74) *Attorney, Agent, or Firm* — Nath, Goldberg & Meyer; Jerald L. Meyer

(57) ABSTRACT

A mobile data memory which is designed such that it can be used in an intrinsically safe manner in explosion-prone areas includes a memory device which has a first interface and a second interface for data exchange, wherein the second interface is designed in an intrinsically safe manner and for data exchange with a device, in particular with a sensor, and the first interface is designed for data exchange with data processing equipment, in particular for data evaluation.

11 Claims, 2 Drawing Sheets

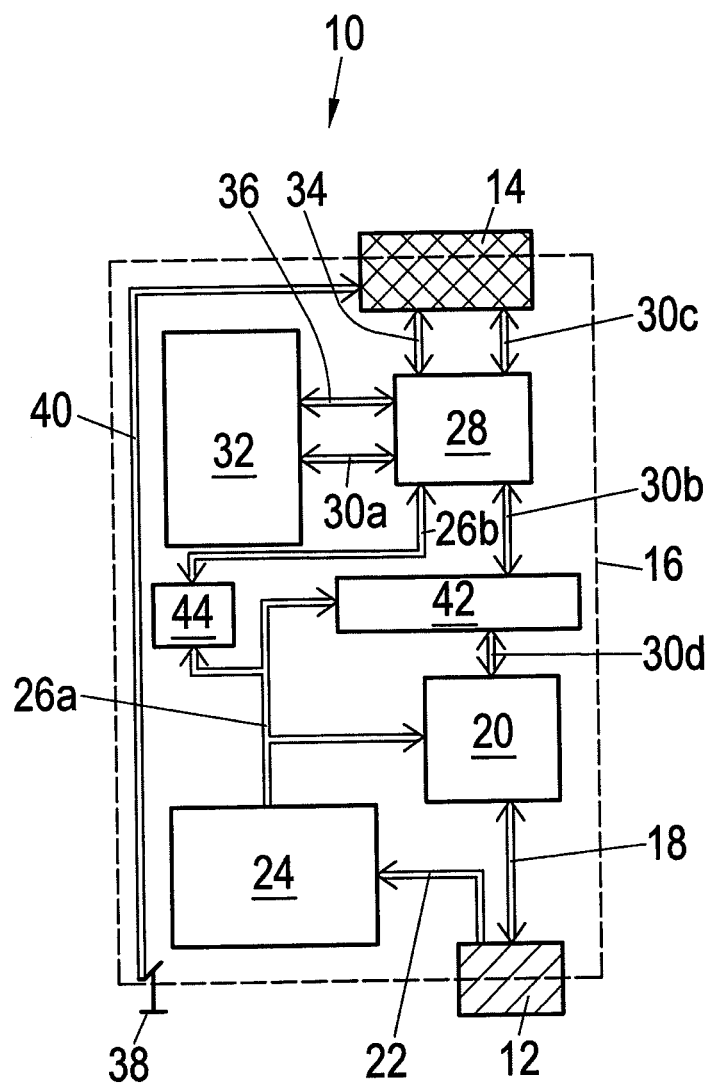

MOBILE DATA MEMORY

Figure 1:
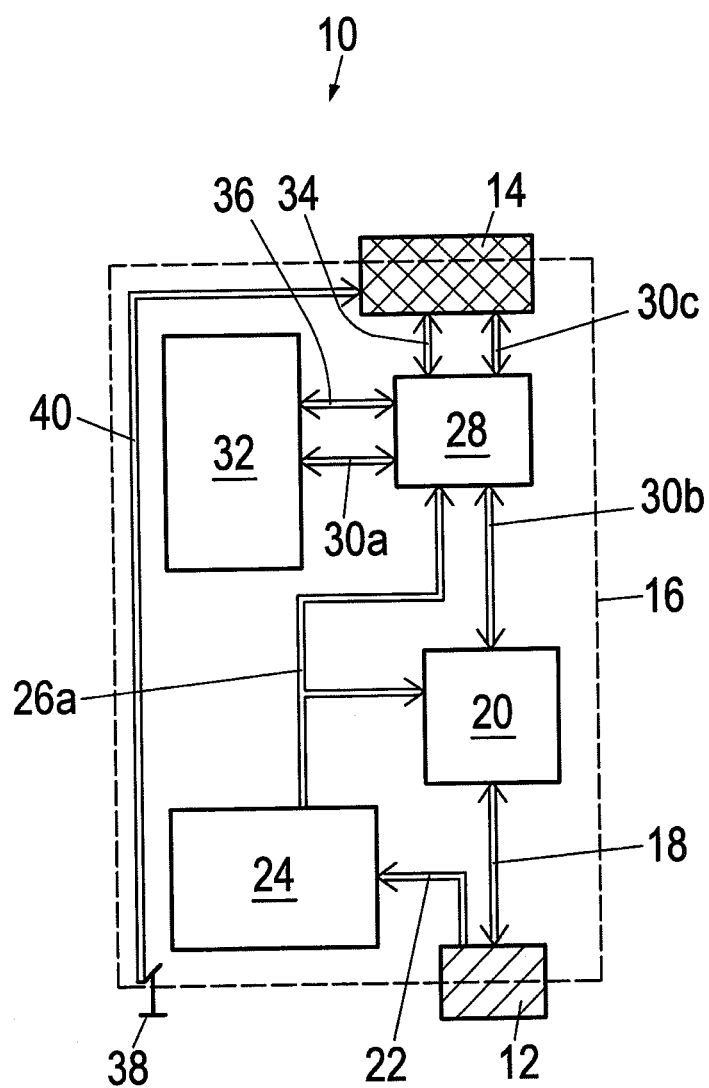

The present invention relates to a mobile data memory having a memory device, wherein the mobile data memory is designed so that it can be used in an intrinsically safe manner in explosion-prone areas.

Data memories of this type are generally known and are in particular used in explosion-prone areas. In this respect, intrinsically safe means that the currents and voltages used in the data memory in the explosion-prone area do not provide sufficient energy to trigger an explosion.

Data memories of the known kind are used inter alia to exchange date between data processing equipment (e.g. PCs) outside the explosion-prone area and devices (e.g. sensors) in an explosion-prone area. Configuration data can in this manner, for example, be transported to the device and measured data can be transmitted from the device to an evaluation system without a direct data connection to the explosion-prone area being necessary.

In known data memories, an interface is used for reading and writing the data in the data memory. This interface must be able to communicate both with the data processing equipment and with the device. The following known solutions are implemented in this respect:

On the one hand, a standardized interface can be used (e.g. USB—universal serial bus) which is customary for data processing equipment. In this case, the device likewise has to have a standardized (USB) interface. The USB protocol has to be implemented in a complex manner for this purpose, whereby extensive tests are required for ensuring the operational security and for the certification for explosion-prone areas.

On the other hand, a simple interface, for example a proprietary interface, can be used which then, however, makes a special converter necessary for the connection of the data memory to a PC. Such a data memory having a proprietary interface for connection to a converter for transporting the data onward to a PC is disclosed, for example, in DE 103 44 263 A1.

In both solutions, however, all the components of the data memory have to be designed as intrinsically safe.

It is the underlying object of the invention to provide a mobile data memory for data exchange with devices in explosion-prone areas which ensures high operational security and is nevertheless of a simple design.

The object is satisfied by a mobile data memory having the features of claim 1 or by a system having the features of claim 8. The data memory in accordance with the invention in particular has a first and a second interface for data exchange, with the second interface being designed as intrinsically safe and for data exchange with a device, in particular a sensor, and with the first interface being designed for data exchange with data processing equipment, in particular for data evaluation.

Advantageous embodiments of the invention are described in the description, in the drawings and in the dependent claims.

In accordance with a first advantageous embodiment, the two interfaces are configured for different data exchange standards. In this manner, a respective suitable interface can be provided both for the data processing equipment and for the device. For example, the first interface can be designed as a USB interface for data exchange with a PC, whereas the second interface can be formed as an SPI interface (serial peripheral interface) for data exchange with the device in an explosion-prone area.

In this manner, both the connection to the data processing equipment and to the device is possible without any additional hardware. A standardized interface protocol can thus be used on the side of the data processing equipment which is usually available on PCS and which does not require any special certification due to its use in an office environment, whereas a protocol for data exchange with the data memory can be implemented on the device side which is easy to implement and which thus moreover does not make necessary any high effort for the certification and for the demonstration of operational safety.

In accordance with a further advantageous embodiment, the first interface is arranged so that it is not accessible when the second interface is being used. The data memory can therefore be designed so that, for example, the USB interface is not accessible mechanically and/or electrically when the data memory is connected to the device via the SPI interface. Since the first interface can thus anyway not be used when the second interface is in use, it is not necessary to activate the first interface on a use in explosion-prone areas.

In accordance with a further advantageous embodiment, the second interface is designed so that data transmitted to the memory device by it are stored in the memory device without the use of a file system. Data can be written directly into the memory device through the second interface due to the dispensing with of a file system.

The implementation of the second interface is thus less complex since the demands of the file system do not have to be taken into account. In particular no metadata have to be written into the memory device which, for example, contain a list of the files present with their size and date of creation as well as possible reading and writing rights, etc. Data of the device can thus be stored, for example, as a continuous stream in the memory device.

Alternatively, a simple proprietary file system can also be used which, for example, only indicates the start of new files within the continuous stream. Such an implementation can be realized considerably faster than the implementation of a file system which is usually used in PCs (e.g. FAT, FAT32 or NTFS).

In accordance with a further advantageous embodiment, the first interface includes a control unit which carries out a conversion into a file system of the data stored in the memory device without using a file system. The control unit can therefore emulate a file system on a connection of the data memory to data processing equipment which may be necessary for the data transmission from the data memory to the data processing equipment. If e.g. the data were stored as described above as a continuous stream in the memory device, the control unit of the data processing equipment thus e.g. indicates a single file, whereas on the use of a proprietary file system the control unit of the data processing equipment can also indicate a plurality of files or directories. The emulated file system can be any desired known file system (e.g. FAT, FAT32, NTFS, ext3 or HFS) which is compatible with the data processing equipment.

In accordance with a further advantageous embodiment, the control unit is switched off when the second interface of the data memory is being used. As stated above, the first interface can be arranged and/or configured such that it is not accessible when the second interface is being used. The control unit connected to the first interface can thus be switched off. It is then not active on the use of the mobile data memory in explosion-prone areas.

In accordance with a further advantageous embodiment, the first and second interfaces are galvanically separate from one another. This measure increases safety on use in explosion-prone areas since a possibly not intrinsically safe interface is then not only switched off, but has no electrical connection at all to the second interface active in the explosion-prone area.

The invention further relates to a sensor system having a data memory in accordance with the invention, a sensor with an interface for communication with the second interface of the data memory and an evaluation system in the form of data processing equipment, with the data processing equipment making communication possible with the first interface of the data memory.

The sensor of the sensor system can in this respect be arranged in an explosion-prone area, with a data exchange with the sensor taking place by means of the second interface of the data memory. After the data exchange, the data memory can be removed from the explosion-prone area and can be connected to data processing equipment which communicates with the data memory by means of the first interface. The data thus transferred can be evaluated using an evaluation system which has an interface to the data processing equipment.

The effort for the certification for SIL (safety integrity level) applications is in particular also considerably lower using the mobile data memory in accordance with the invention and the sensor system in accordance with the invention.

The invention will be described in the following purely by way of example with reference to possible embodiments and to the enclosed drawings. There are shown in a schematic representation:

FIG. 1 a mobile data memory in accordance with the invention; and

FIG. 2 a mobile data memory in accordance with the invention which has a galvanic separation of a first and second interface.

A data memory 10 is shown in FIG. 1 which has a first interface 12 as well as a second interface 14. The first interface 12 is designed as a USB interface and is arranged in a housing 16 such that it is not accessible when the second interface 14 designed as an SPI interface is being used.

The first interface 12 is connected by means of a USB connection to a control unit which is designed as a processor 20 (CPU). The first interface 12 is furthermore connected via a USB supply line 22 to a power supply line 24 which supplies the processor 20 and a commutator 38 with an operating voltage of 3.3 volts by means of a supply line 26a. The commutator 28 allows a data connection of a memory device 32 to the processor 20 or to the second interface 14 by means of SPI connections.

The commutator 28 can alternatively also be supplied with operating voltage via the SPI supply 34. The memory device 32 is in turn supplied from the commutator 28 via an operating voltage supply 36.

Signals are transmitted by a switch 38 and a signal line 40 to a connected second interface 14, with the signals serving for the triggering of specific events in the device such as the starting of a measurement or data transmission.

In operation, the data memory 10 is connected to a device or to a sensor by means of the second interface 14. The commutator 28 as well as the memory device 33 are supplied with current and thus activated via the SPI supply 34 and the operating voltage supply 36 by the connection. The processor 20 and the power supply device 24 are not active. Since the coupling of the data memory 10 to the sensor takes place in an explosion-prone environment, the process 20 belonging to the first interface 12 and the power supply device 24 have to remain switched off.

After the connection of the data memory 10 to the sensor, the data exchange of the sensor with the memory device 32 takes place via the SPI connections 30a and 30c, the commutator 28 and the second interface 14.

The second interface 14, the commutator 28 and the memory device 32 can therefore be active within the explosion-prone area. These components of the data memory 10 as well as the associated supply and data lines 30, 34, 36 consequently have to be configured as intrinsically safe.

After termination of the data transmission, the data memory 10 is removed from the explosion-prone area and is connected to the first interface 12 having a data processing device (e.g. an external PC). The connection takes place via a USB interface of the PC which has an integrated power supply via which the power supply device 24 is activated by means of the USB supply line 22. The power supply device 24 now supplies the processor 20 and the commutator 28, and via the latter indirectly the memory device 32, via the supply line 26a. A data exchange can thus takes place between the PC and the memory device 32 via the SPI connection 30a, the commutator 28, a further SPI connection 30b, the processor 20, the USB connection 18 and the first interface 12. The processor 20 in this respect converts the data received via the SPI connection 30b for the transmission via the first interface 12 such that a file system for the PC is emulated. The data exchange between the PC and the sensor is then ended.

Alternatively, the data exchange can also take place first with the PC and subsequently with the sensor.

The embodiment shown in FIG. 2 differs from that shown in FIG. 1 in that the first interface 12 is galvanically separate from the second interface 14. For this purpose, an optocoupler 42 is connected between the commutator 28 and the processor 20 which is connected to the commutator 28 and to the processor 20 via SPI connections 30b and 30d. The optocoupler 42 for this purpose has a sufficient air path and creepage path and is supplied via the supply line 26a from the power supply device 24. A galvanically safely separate DC-DC converter 44 is interposed for the power supply of the commutator 28 by means of a power supply 26b. There is thus no electrical connection between the first interface 12 and the second interface 14. It is thus precluded that unwanted currents or voltages which could trigger an explosion are applied to the first interface 12 on an operation of the second interface 14 in an explosion-prone area. The operating safety is increased in this manner.

REFERENCE NUMERAL LIST 10 data memory
12 first interface
14 second interface
16 housing
18 USB connection
20 processor
22 USB supply line
24 power supply device
26a, 26b supply line
28 commutator
30, 30a, 30b, 30c, 30d SPI connection
32 memory device
34 SPI supply
36 operating voltage supply
38 switch
40 signal line
42 optocoupler
44 galvanically separate DC-DC converter

The invention claimed is:

1. A mobile data memory (10) having a memory device (32), wherein the mobile data memory is designed such that it can be used in an intrinsically safe manner in explosion-prone areas,
   wherein the memory device (32) has a first interface (12) and a second interface (14) for data exchange, wherein the second interface (14) is designed as intrinsically safe and for data exchange with a device and wherein the first interface (12) is designed for data exchange with data processing equipment.

2. A mobile data memory (10) in accordance with claim 1, wherein the second interface (14) is designed as intrinsically safe and for data exchange with a sensor.

3. A mobile data memory (10) in accordance with claim 1, wherein the first interface (12) is designed for data evaluation with the data processing equipment.

4. A data memory (10) in accordance with claim 1, wherein the two interfaces (12, 14) are configured for different data exchange standards.

5. A data memory (10) in accordance with claim 4, wherein the first interface (12) is configured for USB (universal serial bus) and the second interface (14) is configured for SPI (serial peripheral interface).

6. A data memory (10) in accordance with claim 1, wherein the first interface (12) is arranged so that it is not accessible when the second interface (14) is being used.

7. A data memory (10) in accordance with claim 1, wherein the second interface (14) is designed so that data transmitted to the memory device (32) by it are stored in the memory device (32) without using a file system.

8. A data memory (10) in accordance with claim 7, wherein the first interface (12) includes a control unit (20), wherein the control unit (20) is adapted to carry out a conversion of the data stored in the memory device (32) into a file system.

9. A data memory (10) in accordance with claim 8, wherein the control unit (20) is switched off when the second interface (14) of the data memory (10) is being used.

10. A data memory (10) in accordance with claim 1, wherein the first interface (12) and the second interface (14) are galvanically separate from one another.

11. A sensor system comprising
   a data memory (10) having a memory device (32), wherein the mobile data memory is designed such that it can be used in an intrinsically safe manner in explosion-prone areas,
   wherein the memory device (32) has a first interface (12) and a second interface (14) for data exchange;
   an intrinsically safe sensor having an interface for communication with the second interface (14) of the data memory (10); and
   data processing equipment, wherein the data processing equipment enables a communication with the first interface (12) of the data memory (10).

* * * * *